United States Patent [19]

Lamerant

[11] Patent Number: 5,102,512
[45] Date of Patent: Apr. 7, 1992

[54] PROCESS FOR EXTRACTING AND PURIFYING GALLIUM FROM BAYER LIQUORS

[75] Inventor: Jean-Michel Lamerant, Bouc Bel Air, France

[73] Assignee: Aluminium Pechiney B.P., Gardanne, France

[21] Appl. No.: 620,387

[22] Filed: Nov. 30, 1990

Related U.S. Application Data

[63] Continuation of Ser. No. 202,308, Jun. 2, 1988, abandoned.

[30] Foreign Application Priority Data

Jun. 2, 1987 [FR] France .................. 8708013

[51] Int. Cl.⁵ .................................. C25C 1/00
[52] U.S. Cl. .......................... 204/105 R; 423/112; 423/127; 423/600; 423/DIG. 4; 75/743; 210/668; 210/681; 210/685
[58] Field of Search .......... 204/105 R; 423/112, 423/127, 600, DIG. 4; 75/101 BE; 210/668, 681, 685

[56] References Cited

U.S. PATENT DOCUMENTS

| | | | |
|---|---|---|---|
| 3,637,711 | 1/1972 | Budde . | |
| 4,169,130 | 9/1979 | Helgorsky et al. | 423/112 |
| 4,220,726 | 9/1980 | Warshawsky | 521/55 |
| 4,241,029 | 12/1980 | Helgorsky et al. | 423/112 |
| 4,297,325 | 10/1981 | Scherzer et al. | 423/122 |
| 4,389,379 | 6/1983 | Rouillard épouse Bauer et al. | 423/89 |
| 4,404,174 | 9/1983 | Leveque et al. | 75/101 BE |
| 4,437,994 | 3/1984 | Baker | 210/638 |
| 4,468,374 | 8/1984 | Kataoka . | |
| 4,485,076 | 11/1984 | Bauer et al. | 423/112 |
| 4,559,203 | 12/1985 | Bauer et al. | 423/112 |
| 4,587,111 | 5/1986 | Wynn | 423/112 |
| 4,631,177 | 12/1986 | Yotsuyanagi et al. | 423/112 |
| 4,639,355 | 1/1987 | Matsui et al. . | |
| 4,666,575 | 5/1987 | Kubo | 204/105 R |
| 4,666,686 | 5/1987 | Krajenski et al. | 423/89 |
| 4,728,505 | 3/1988 | Era et al. | 423/132 |

FOREIGN PATENT DOCUMENTS

| | | | |
|---|---|---|---|
| 0021990 | 1/1981 | European Pat. Off. | 423/112 |
| 0206081 | 1/1981 | European Pat. Off. . | |
| 0102882 | 3/1984 | European Pat. Off. | 423/112 |
| 0258146 | 3/1988 | European Pat. Off. . | |
| 0340547 | 11/1989 | European Pat. Off. . | |
| 2743475 | 3/1978 | Fed. Rep. of Germany | 423/112 |
| 60-166224 | 8/1985 | Japan | 423/112 |
| 991613 | 5/1965 | United Kingdom . | |

OTHER PUBLICATIONS

Chemical Abstracts, vol. 101, 1984, Abstract No: 75271b.
Chemical Abstracts, vol. 105, 1986, Abstract No. 85696r.
Hydrometallurgy, 4(1979) 285–290, "Liquid-Liquid Extraction of Gallium by Tri-n-Butyl Phosphate". Communication to ISEC, Munich, 1986.
Chemical Abstracts, vol. 104, 1986 p. 567, resume no. 14014k, Columbus, Ohio US; L. Bokobza et al.: "Spectroscopic investigation of absorbed 7-(4-ethyl-1-methyloctyl)-8-quinolinol (Kelex 100) and of its gallium (III) complex; comparison with the behaviors observed in solvent extraction systems".

*Primary Examiner*—John Niebling
*Assistant Examiner*—David G. Ryser
*Attorney, Agent, or Firm*—Oblon, Spivak, McClelland, Maier & Neustadt

[57] ABSTRACT

A process for extracting and purifying the gallium contained in an industrial solution of sodium aluminate by fixing the gallium on a stationary phase constituted by porous polystyrene adsorbent resin which is impregnated with an extracting agent, optionally in the presence of a surface-active agent. After elution of the gallium in acid medium, the resultant gallium salt is purified and concentrated so as to be reduced directly to the state of high purity metallic gallium, by electrolysis.

28 Claims, 3 Drawing Sheets

PROCESS FOR EXTRACTING AND PURIFYING GALLIUM FROM BAYER LIQUORS

This application is a continuation of application Ser. No. 07/202,308, filed on June 2, 1988, now abandoned.

BACKGROUND OF THE INVENTION

1. Field of the Invention

The present invention relates to processes for extracting and purifying the gallium contained in sodium aluminate solutions.

2. Discussion of the Background

Gallium, which has been known for a long time merely for its properties of melting at low temperature allowing the production of low melting point alloys, has benefitted for some years from considerable renewed recognition owing, in particular, to the development of gallium arsenide for the electronics industry. Gallium arsenide is preferred, for example, to silicon as semiconductor in certain very specific conditions of use.

A significant amount of gallium currently originates from Bayer liquors which are sodium aluminate solutions resulting from the attack on bauxite by sodium hydroxide in the Bayer process which is well known for the production of alumina trihydrate. Despite a relatively high content of from 150 to 500 mg of gallium per liter of liquor, it is difficult to recover the gallium selectively in the presence of large quantities of aluminum, which has very similar chemical properties, and of other impurities which are soluble in a highly alkaline medium, vanadate, zincate, ferrate, molybdate, etc.

Electrolysis using a mercury cathode was the only process adopted when the quantities of gallium to extract were small. But, with increasing requirements for gallium, the problems posed by the handling of large quantities of mercury, the low faradic yields and, in particular, the inadequate purity of the product obtained, the person skilled in the art has rapidly turned to processes in which the stages of extraction of dissolved gallium and of reduction to the metallic state by cementation or electrolysis are quite distinct and often separated by intermediate and complementary purification and concentration operations.

The improvement in the quality of the product, on the other hand, has entailed some more highly complex and therefore more cumbersome processes and has, in fact, led to an increase in the sources of material losses and to increasingly awkward operating and production conditions.

However, interesting results have been obtained in the initial stage of recovering gallium from alkaline solutions of sodium aluminate by liquid-liquid extraction processes employing 8-hydroxyquinoline or oxine. In particular, interesting results have been obtained with 8-hydroxyquinolines substituted at the 7-position, according to U.S. Pat. No. 3,637,711, which act as complexing agents for gallium, allowing the use of non-chlorinated solvents.

At the same time, the problem of improving the kinetics of liquid-liquid extraction of the gallium has been investigated by the company Rhone-Poulenc. Thus, significant progress has been made by increasing the exchange surfaces between the extracting agent, 7-alkenyl-8-hydroxyquinoline, and the gallium-containing alkaline solution by the formation of a microemulsion (EP 0102280 and EP 0102882 (=U.S. Pat. No. 4,559,203)).

However, owing to the considerable volumes of extracting agent and of solvent to be used, then to be regenerated in order to extract the gallium contained in the Bayer liquor, on an industrial scale, considerable research has been undertaken in order to extract the gallium on ion exchange resins. Thus, U.S. Pat. No. 4,468,374 has proposed extraction using a resin containing the amide-oxime function as the active grouping. Although apparently more attractive than liquid-liquid extraction, this process has turned out to be very difficult to carry out due to the fragility of the amide-oxime groupings and to the degradation of the resin during the successive cycles of elution in an acid medium of the gallium fixed on the resin.

For its part, the company Mitsubishi Chemical Industry, in its Japanese patent published under No. J60-042234A (=U.S. Pat. No. 4,631,177), has proposed that adsorbent resins based on macroporous polymers be impregnated with complexing agents for the 7-alkenyl-8-hydroxyquinoline group, demonstrating that it was possible to fix small quantities of gallium in solution on the stationary phase thus formed, then to elute the gallium with conventional mineral acids. However, this patent does not mention the capacities of these resins more specifically with regard to the charges of gallium which might be fixed. Furthermore, all the extraction tests described have been carried out on a very dilute sodium aluminate solution, ruling out direct application of the process to industrial Bayer liquors.

Quite recently, in a communication sent to the I.S.E.C. in Munich in September 1986, Cote and Bauer have examined the influence of various parameters, such as the quantity of extracting or complexing agent fixed on the resin, the concentrations of gallium, aluminum and sodium hydroxide, the chemical nature of the adsorbent resin as well as the effect of additives capable of activating the kinetics, on various adsorbent resins sold under the generic name of Amberlite XAD and impregnated with 7-alkyl-8-hydroxyquinoline sold under the trade name of "Kelex 100". It has been found that fixing capacities higher than 3 grams of gallium per liter of resin have been obtained with the Amberlite XAD 7 resin having an acrylic ester skeleton and a semi-polar nature, but with sodium aluminate solutions having a gallium concentration at least 5 times higher than that of industrial liquors, ruling out any possibility of application of the process to these liquors whose concentration cannot be altered in any case.

Finally, a practical drawback inherent in the majority of industrial processes employing porous adsorbent resins is the preparation of the resin, during which the resin is hydrated and degassed under vacuum. This operation becomes very awkward to carry out once several hundreds of liters of resin have to be treated.

Under these circumstances, the only industrial processes by which a person skilled in the art can recover and purify gallium directly from alkaline solutions of sodium aluminate are liquid-liquid extraction processes using, as extracting agent, 8-hydroxyquinolines which are substituted at the 7-position with their known disadvantages of the high investment and production cost resulting from the considerable volumes of reagents and, in particular, of extracting agent and solvent to be used, but also from the losses of reagents by degradation and the losses of gallium by entrainment.

There is thus a need for a process for the efficient extraction of gallium contained in sodium aluminate solutions.

SUMMARY OF THE INVENTION

Accordingly, it is an object of this invention to provide a process for extracting and purifying gallium contained in industrial solutions of sodium aluminate.

It is another object of this invention to provide a process for extracting and purifying gallium contained in a Bayer liquor.

The inventor has now discovered a process which satisfies all of the above objects of this invention and other objects which will become apparent from the description of the invention given hereinbelow.

The invention thus relates to the extraction of gallium directly from industrial solutions of sodium aluminate by fixing the gallium on a stationary phase constituted by an impregnated resin, with restitution without loss of gallium during elution thereof in an acid medium.

The present invention also relates to the concentration and purification of the gallium in acid solution recovered in this way in order to reduce it directly into metallic gallium having a purity of 4N by electrolysis.

More specifically, the process according to the invention is a process for the extraction and purification of the gallium contained in an industrial solution of sodium aluminate. In this process the gallium is fixed on a stationary phase constituted by a porous adsorbent resin impregnated with an extracting agent. The gallium is then eluted in an acid medium to form a gallium salt in solution which, after purification and concentration, is reduced to the state of metallic gallium.

BRIEF DESCRIPTION OF THE DRAWINGS

A more complete appreciation of the invention and many of its attendant advantages will be readily obtained as the same becomes better understood by reference to the following detailed description when considered in connection with the accompanying drawings, wherein.

DETAILED DESCRIPTION OF THE PREFERRED EMBODIMENTS

Figure 1:
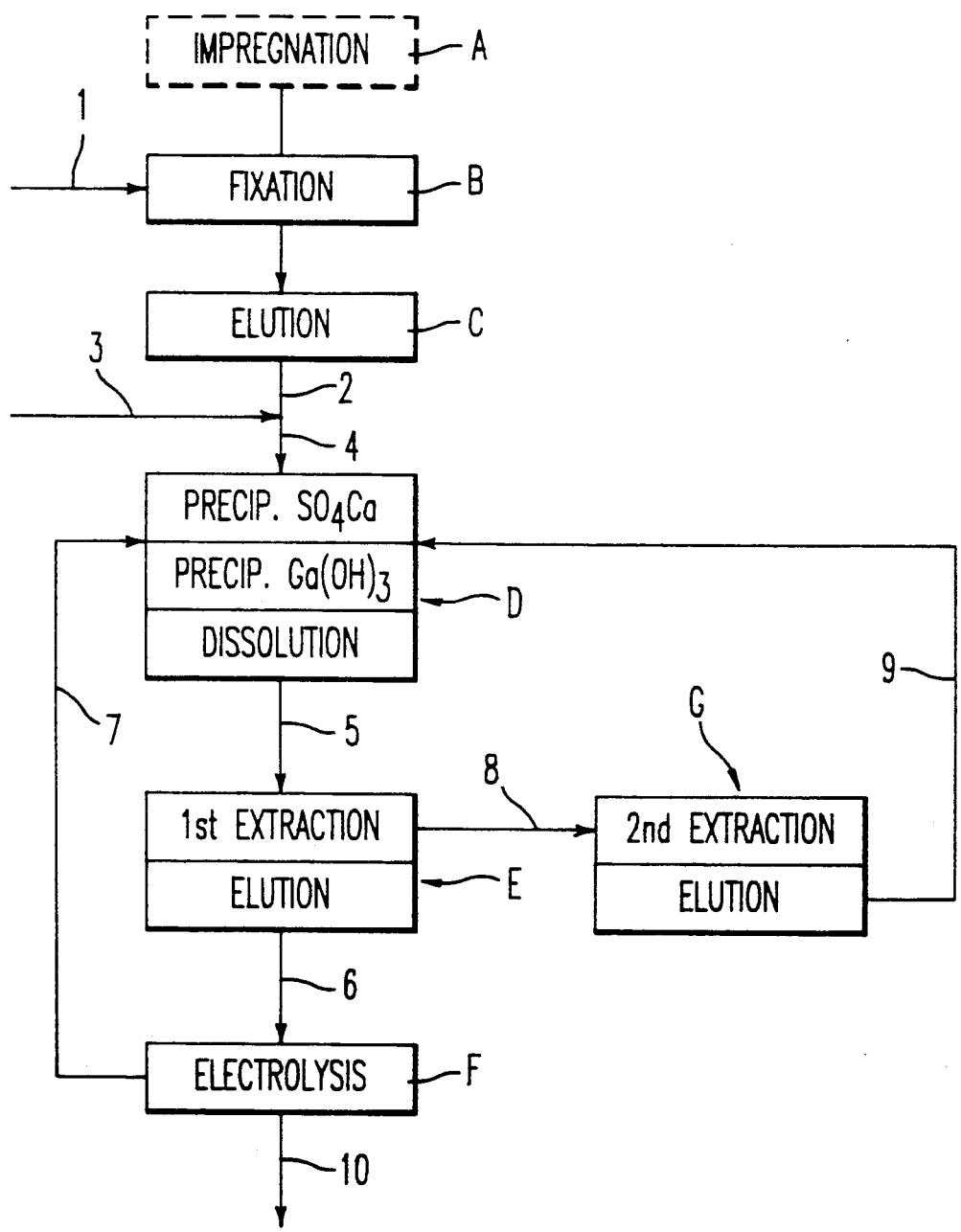
FIG. 1 illustrates the process of the present invention.

The present invention relates to a process for extracting and purifying the gallium contained in sodium aluminate solutions resulting from the attack on bauxites by sodium-containing materials during the Bayer process. It relates more specifically to a process for extracting the gallium in an alkaline solution using an adsorbent resin impregnated with a complexing agent for gallium, followed by purification of the gallium extracted in this way which leads to an acid solution of concentrated gallium chloride. This solution enables metallic gallium of high purity to be obtained directly by electrolysis.

This process is characterized by the following stages:

A) Impregnation of the porous adsorbent resin in the presence of a volatile solvent with a 7-alkyl-8-hydroxyquinoline as an extracting agent to which a surface-active agent has optionally been added;

B) Fixing of the gallium, after evaporation of the solvent and hydration of the resin, by passing a sodium aluminate solution taken directly from the Bayer cycle and kept at a temperature of between 30° and 60° C. over said resin;

C) Elution of the gallium, after washing the resin with water, with a strong mineral acid and preferably sulphuric acid, the concentration of which is adjusted between 0.7 N and 7 N;

D) A first purification and concentration of the gallium in solution by precipitation in a reducing agent in the state of gallium hydroxide and hydrochloric redissolution of the precipitate, this precipitation preferably being preceded by preneutralization of the sulphuric acid in the form of calcium sulphate;

E) A second purification and concentration of the gallium in solution in the chloride state by extraction using an organic solution based on tributylphosphate until it is saturated in gallium, optional washing with an aqueous phase itself loaded with gallium, finally elution with water of a solution of concentrated and purified gallium chloride; and F) Electrolysis of the concentrated and purified gallium chloride solution in order to obtain metallic gallium having a purity of 4 N.

During research into the extraction of gallium on a porous resin in a strongly alkaline medium, excellent results with regard to the gallium-fixing capacities of a resin have been recorded with non-polar porous resins having a polystyrene aromatic nucleus marketed under the name of XAD 1180 by the company Duolite International. It has surprisingly been found that this type of resin, impregnated under well-defined conditions, could fix at least 3 grams of gallium per liter of resin within a few hours of contact, despite its non-polar and hydrophobic nature, without degradation of the stationary ion exchange phase and directly from the sodium aluminate solution taken from the Bayer cycle after the so-called precipitation stage in which a proportion of the alumina in solution is precipitated.

The microporous XAD 1180 resin is impregnated by mixing it with a solution composed of the extracting agent, which is a 7-alkyl-8-hydroxyquinoline, e.g., a 7-($C_{1-20}$)alkyl-8-hydroxyquinoline, preferably a 7-alkyl-8-hydroxyquinoline marketed under the name of Kelex 100, of ethanol as solvent and of the surface-active agent which is a quaternary ammonium chloride corresponding to the formula $R_3CH_3NCl$, in which R contains between 8 and 10 carbon atoms.

Kelex 100 is currently produced and marketed by Schering Industrial Chemicals under the trademark "Kelex" in Europe and under the trademark "Sherex" in the U.S.A. The surface-active agent, $R_3CH_3NCl$, is marketed under the name of Adogen 464 by Sherex Chemical Co.

Economically speaking, the value of this wetting agent is considerable because, at the end of impregnation by the Kelex 100 extracting agent, the resin is hydrated in an aqueous medium after having been dried to remove the solvent. It can then be used directly without a need for degassing under vacuum as is normally the case.

The quantity of extracting agent is determined as a function of the volume of resin to be impregnated and should preferably be between 150 g and 400 g of Kelex 100 per liter of dry XAD 1180 resin. The quantity of Adogen 464 surface-active agent, which should preferably be between 5 and 15% by weight, is adapted relative to the weight of Kelex 100 determined in this way. The proportion of Kelex in the ethanol is not critical and should be adjusted such that the volume of solution is sufficient to wet the resin thoroughly.

The hydrated resin which is ready for use is placed in a column and is brought into contact with the industrial solution of sodium aluminate taken from the Bayer cycle after the so-called precipitation stage in which a proportion of the alumina in solution precipitates. The solution of sodium aluminate kept at a temperature of between 30° and 60° C., but preferably at about 50° C., is pumped into the resin column at an hourly flow rate of 2 to 10 times the apparent volume of resin contained in the column, that is to say at from 2 to 10 BV/hour.

The gallium content of industrial sodium aluminate solutions is generally between 150 mg/liter and 500 mg/liter, whereas the concentration of sodium hydroxide, expressed as $Na_2O$, varies between 100 g/liter and 220 g/liter and the concentration of $Al_2O_3$ varies between 50 g/liter and 130 g/liter.

The solution is pumped through the resin bed for a period of about 4 to 12 hours in the case of solutions containing from 200 to 300 mg of gallium per liter, and the quantity of fixed gallium is about 3 to 4 g/liter of resin. The selectivity of separation of gallium and aluminum is high because the ratio by weight Al/Ga, which is generally between 200 and 500 in the liquor, is lowered to between 0.5 and 2 in the resin which has fixed the gallium.

Before elution, the resin is washed with one to three times its volume of water. The washing water loaded with aluminate and free sodium hydroxide is recycled into the Bayer circuit. Elution is carried out twice with a strong acid solution at about 50° C., preferably with a sulphuric solution having a concentration which is initially between 0.7 N and 1.2 N, in order to eliminate the majority of the fixed aluminum, and then between 4 N and 7 N to extract and solubilize the gallium. Final washing of the resin is carried out with one to three times its volume of water, the majority of which is recycled in an upstream stage, as indicated in the example.

To the acid elution solution containing gallium in contents of between 1 g and 20 g per liter, but also impurities such as aluminum (Al<1 g/liter), iron (Fe <100 mg/l), zinc (Zn<10 mg/l), sodium (Na<60 mg/l) there can be added at this stage, in any proportion, impure acid solutions of external origin having similar gallium concentrations and emanating from other gallium recovering processes, such as acid solutions for extracting gallium by liquid-liquid means from alkaline liquors containing it and the acid solutions for attacking gallium-containing waste based on gallium arsenide.

The resultant acid solution of gallium, insofar as it contains free sulphuric acid, is pre-neutralized of milk of lime or calcium carbonate to pH=2 and at a temperature of about 60° C. so as to precipitate the $SO^{4-}$ ions in the state of calcium which is removed, for example, by filtration. This pre-neutralization with milk of lime or calcium carbonate, which is less expensive than sodium hydroxide, allows certain residual organic substances to be entrained, generally in the state of traces which attach themselves to the solid particles of precipitate.

The gallium solution which does not contain free sulphuric acid is then mixed with recycled acid solutions which are partially depleted in gallium in the chloride state originating from the downstream purification/concentration and electrolysis stages. The resultant acid solution of gallium is then neutralized by sodium hydroxide to pH=4 in the presence of a reducing agent, sodium thiosulphate, to precipitate the gallium hydroxide $Ga(OH)_3$, while the main metallic impurities in the divalent state, such as iron and zinc, remain in solution. After filtration and washing, the gallium hydroxide cake is redissolved by concentrated HCl in the state of $GaCl_3$.

A light, insoluble compound of elementary sulphur may be formed and can be removed by filtration. Significant purification of the gallium in solution is observed at this stage since, in comparison with the acid solution of gallium after elution of the resin, the zinc and iron contents relative to the gallium are divided by 97 and 47 respectively.

In the following stage, the acid solution of gallium chloride is placed in contact, at ambient temperature, with an organic solution composed of a mixture of tributylphosphate (TBP) and an alcohol generally containing between 8 and 13 carbon atoms, these constituents being dissolved in a heavy aromatic solvent. This organic extracting solution is most effective when the composition in % by weight is as follows:

25%—TBP
10%—Isotridecanol
65%—Heavy aromatic solvent marketed France under the registered trademark Resex.

To enable this gallium concentration stage also to be an additional purification stage, it is important to saturate the organic phase with gallium so as to leave as large a proportion as possible of less "complexable" metallic impurities, such as Fe, Zn, Al, in the aqueous phase. The nature and composition of the above-mentioned organic solution, with adjustment of the respective volumes of organic phase and aqueous phase, taking into consideration the gallium concentration of the acid solution of gallium chloride, allow the organic phase to be saturated with gallium without a third phase appearing. Thus, for a gallium concentration of at least 30 g/liter in the aqueous phase, the ratio of (volume of organic phase to volume of aqueous phase) is 0.8.

During this extraction operation, the gallium-containing organic phase known as "first extract" is eluted with water to form an organic phase or inorganic solution which is regenerated and re-usable after washing and, on the other hand, an aqueous "first eluate" with a pH≦2 having a high gallium concentration (100 g/liter to 130 g/liter). At this stage, the contents by weight of impurities in the gallium are Fe<50 ppm Zn<1 ppm Al<100 ppm, respectively.

Figure 3:
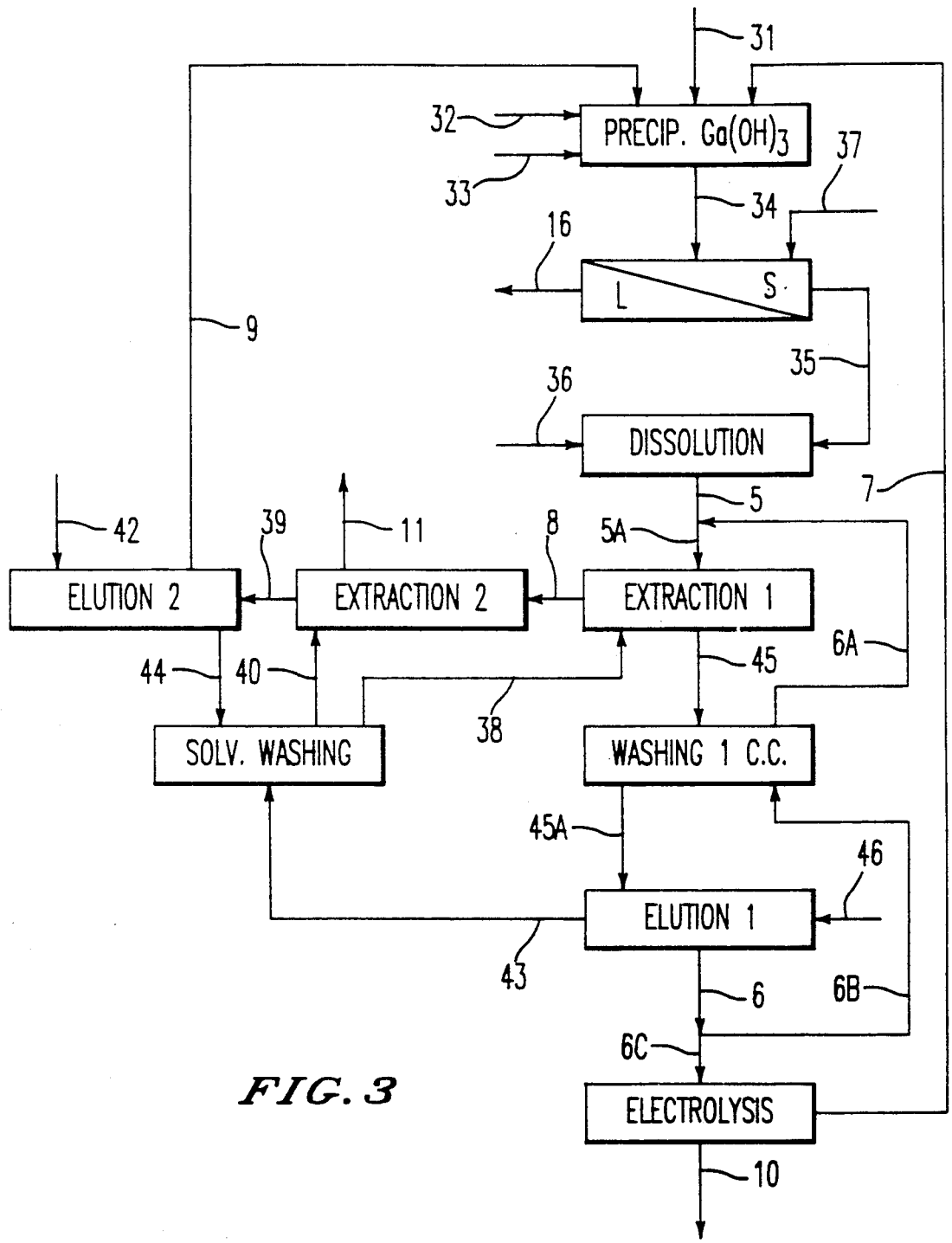

This purification which is already of interest can be further improved by the addition of an intermediate washing stage between the extraction of the gallium by the TBP-based organic phase and its elution in pure water. This washing of the loaded organic phase described below in a variation of the process in Example 2 and FIG. 3 is carried out in a counter-current by an aliquot of the gallium-containing aqueous phase, again known as aqueous first eluate, issuing from the subsequent elution stage. During each washing stage, it is observed that the impurities, including the ferric iron, are distributed clearly in favor of the aqueous phase whereas the gallium is not or is only slightly transferred.

After the counter-current washing operation, the aliquot of gallium-containing aqueous phase is mixed with the acid solution of gallium chloride issuing from upstream before extraction using the organic solution. In contrast to mere extraction/elution without washing, carried out in Example 1, FIG. 2, the purifying effect is cumulative and increases exponentially as a function of the number of washing stages. In comparison with the acid washing operations normally carried out in liquid-liquid extraction, which consume acids of different concentrations depending on the element to be washed, act on few elements at a time and create by-products, the washing process employed here does not consume reagents while having an overall effect on the impurities. Depending on whether this intermediate counter-current washing of the organic solvent is or is not carried out before elution with water, a fraction or all of the aqueous first eluate having a pH $\leq 2$, which is loaded with gallium in the chloride state, is used for producing metallic gallium having a purity of 4 N by electrolysis on a liquid gallium cathode The electrolyte which is impoverished in gallium (10 g/liter to 30 g/liter) is recycled to the gallium hydroxide precipitation stage at pH = 4.

The acid solution which is impoverished in gallium after first extraction with the organic solution known as "first raffinate" which can contain 5 g/liter to 20 g/liter of gallium is subjected to a second extraction operation at ambient temperature using the organic solution still with adjustment of the respective volumes of organic phase and aqueous phase, taking into consideration the gallium contents of the first raffinate. This results in a second raffinate completely depleted in gallium which is neutralized before rejection and a gallium-containing organic phase or "second extract" which is eluted with water. A regenerated organic phase which is re-used after washing and an aqueous acid "second eluate" containing about 30 grams per liter of gallium are obtained. This "second eluate" is recycled as the impoverished electrolyte to the gallium hydroxide precipitation stage to pH = 4.

This process for recovering and purifying gallium from an industrial sodium eluminate solution can therefore be summarized by the sequence of operations shown schematically in FIG. 1.

A) Preparation and impregnation of the XAD 1180 resin with Kelex 100 mixed with a solvent and a surface-active agent.

B) Bringing into contact with the industrial alkaline liquor 1 and fixing of the gallium.

C) Double elution with a strong acid of the gallium over the resin which passes into acid solution and it is optionally mixed with other external acid solutions 3 to give the resultant solution 4.

D) First purification and concentration by:
  a) Optionally pre-neutralization of the sulphuric solutions 4 and mixing with the recycled solutions which are impoverished in gallium 7 and 9.
  b) Precipitation of Ga(OH)$_3$ at about pH = 4.
  c) HCl dissolution of the precipitate, producing liquor 5.

E) Second purification and concentration by:
  a) First extracting of the liquor 5 by saturating with gallium a TBP-based organic solution, producing a first extract which is optionally washed and a first raffinate 8.
  b) First elution with water of the first extract, producing the first eluate 6 which is loaded with gallium for electrolysis.

F) Electrolysis of the eluate 6 with recycling to stage D) of the impoverished electrolyte 7 and production of gallium having a purity of 4 N to 10.

G) Recovery of the first raffinate 8 which is impoverished in gallium with:
  a) Second extraction of 8 with TBP-based organic solution giving a second extract and a second raffinate which is depleted in gallium.
  b) Second elution with water of the second extract, producing the gallium-containing eluate 9, and recycling to stage D).

Other features of this invention will become apparent in the course of the following descriptions of exemplary embodiments which are given for illustration of the invention and not intended to be limiting thereof.

Figure 2:
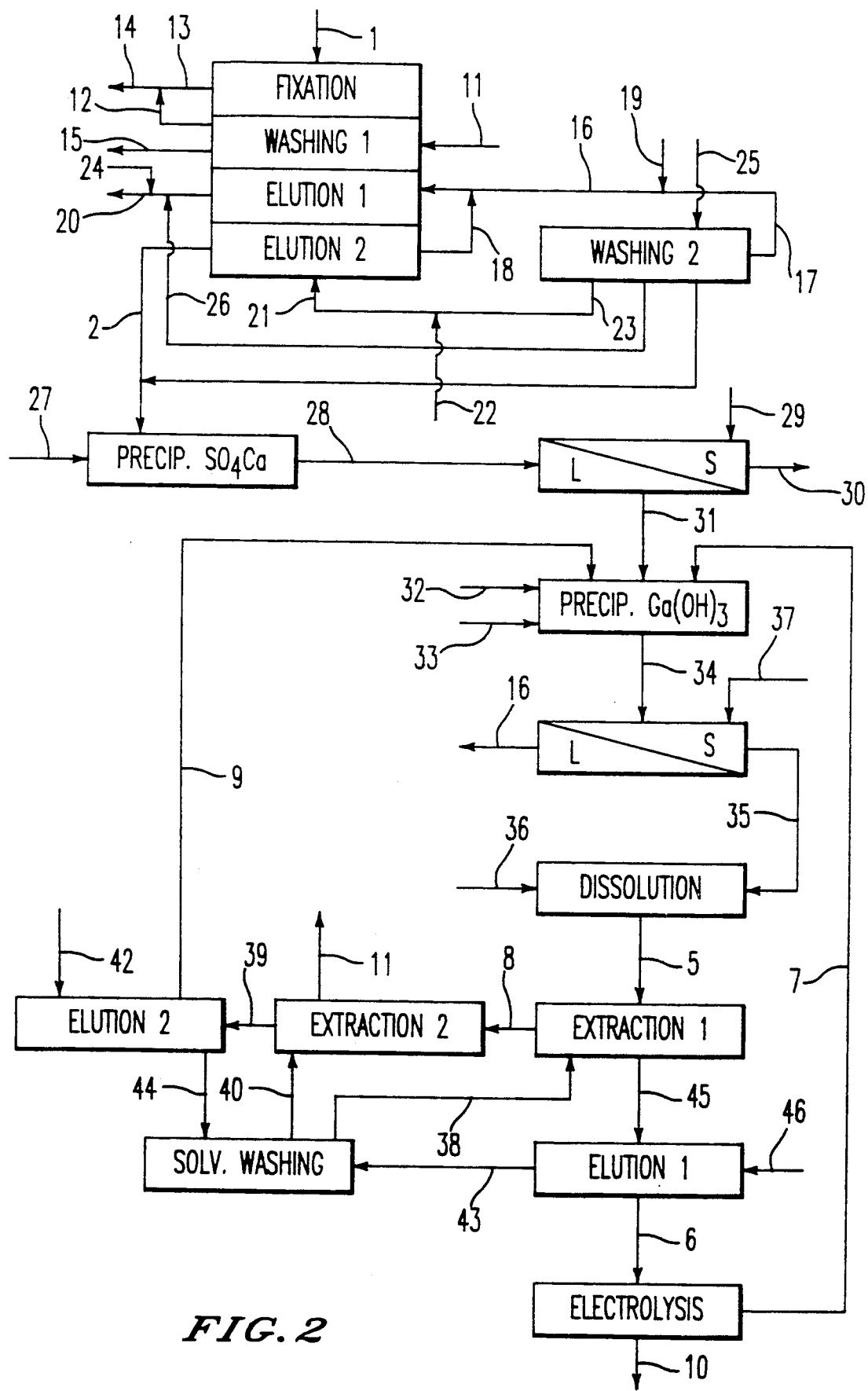
FIGS. 2 and 3 provide flow diagrams of different embodiments of the present invention discussed in the examples provided in this document.

Implementation of the processing according to the invention as well as the advantages resulting from it will be clarified better by the following description of experiments based on the detailed charts of the process according to FIG. 2 and, with regard to the variation involving counter-current washing of the Ga-containing organic phase with an aliquot of the aqueous eluate according to FIG. 3.

EXAMPLE 1

Independently of the known economic advantages resulting from industrial use, when possible, of the processes of extraction and purification using resin, and of from very reasonable investment and production costs, this example of application also aims to demonstrate that, in the process according to the invention, the various flows of product and of reagents are largely controlled and recycled, limiting the consumption of reagent and the losses of material and further contributing to a reduction in the production costs.

The description of the experiment utilizes reference numerals for the flows of substance. As the process is cyclic, certain flows are recycled from a previous experiment and are annotated a, whereas the same flows obtained in the example described are annotated b. The identity or proximity of the values of the flows a and b is obtained when the cycles are reproduced by a stationary operation.

25 Liters of adsorbent resin XAD 1180 were mixed and stirred for 15 minutes to make up 20 liters of a solution having the following composition, by weight: Kelex 100 : 6.25 kg; Adogen 464 (quaternary ammonium chloride): 0.62 kg; 95% ethanol in sufficient quantity for 20 liters. The resin moistened in this way is then dried gently with manual stirring in the heat of a sand bath at about 70° C.

The dry resin loaded with Kelex 100 and Adogen 464 is brought into contact with distilled water. It is observed that the grains hydrate readily and flow. A small quantity of Adogen 464, 10% of the mass of Kelex 100 in this case, is sufficient to render the grains of resin perfectly wettable. The resin hydrated in this way is placed in a column and occupies a volume of 28 liters by volume over a height of 1 m. It is kept in position by two polyester cloth screens.

1000 Liters of liquor 1, decomposed from the Bayer cycle are kept at a temperature of 50° C. and are then pumped through the resin for a period of 6 hours at a rate of about 167 l/h. This same flow rate will be maintained for all liquors which have to pass through the resin. Analysis of the spent liquor 1 is as follows: Total Na$_2$O = 190 g/l; Al$_2$O$_3$ = 109 g/l; Ga = 0.2383 g/l. At the outlet of the column, the mean liquor 13 having a volume of 1000 liters is found by quantitative analysis to contain: total Na$_2$O = 186 g/l; Al$_2$O$_3$ = 106 g/l; Ga = 0.156 g/l.

From the 1000 liters of solution, 82.30 grams of gallium have been fixed, corresponding to 34.5% of the gallium contained in the liquor. On the other hand, the percentage by weight of $Ga/Al_2O_3$ of 0.218% in the liquor has fallen to 0.147% after fixing.

60 Liters of washing water 11 are then passed into the column. A first fraction of 30 liters 12, containing 102 g/l of total $Na_2O$, is collected and is intended to be passed into the Bayer cycle 14 together with the 100 liters 13 previously collected. A second fraction of 30 liters 15, containing no more than 9 g/l $Na_2O$ can be recovered from the Bayer circuit in an appropriate washing stage. A first resin elution operation is then carried out using 45 l of a liquor 16 kept at 50° C. and containing 45.22 g/l of total $H_2SO_4$; 0.133 g/l of Al; 43 g/l of free $H_2SO_4$. This liquor is composed of the mixture of 30 l of liquor 17a containing 12.67 g/l of $H_2SO_4$; 15 l of liquor 18a containing 26.67 g/l of total $H_2SO_4$, 20 g/l of free $H_2SO_4$ and 0.4 g of Al; and 1364 g of 92% sulphuric acid 19. At the outlet of the column there are collected 45 l of a liquor 20 containing, on average: total $H_2SO_4 = 35.55$ g/l; free $H_2SO_4 = 24$ g/l; $Al = 1.69$ g/l; $Na_2O = 0.09$ g/l; Ga = traces.

A second resin elution operation is carried out using 30 l of a liquor 21 which is kept at 50° C., contains; total $H_2SO_4 = 250$ g/l, free $H_2SO_4 = 248.7$ g/l; $Ga = 0.467$ g/l and originates from the mixture of 6.2 kg of 92% $H_2SO_4$ 22 and 27 liters of solution 23a containing: total $H_2SO_4 = 66.55$ g/l; free $H_2SO_4 = 65.2$ g/l; $Ga = 0.519$ g/l. The first 15 liters issuing from the column constitute the liquor 18b. The average liquor 2 then collected is the mixture of the 15 liters displaced by the end of the elution operation with the 15 first liters displaced by the beginning of the final washing operation described below and contains: total $H_2SO_4 = 175.3$ g/l; free $H_2SO_4 = 167.7$ g/l; $Ga = 2.743$ g/l; $Al = 0.28$ g/l; $Fe = 50$ mg/l; $Zn = 3.1$ mg/l; $Na = 39$ mg/l.

At this stage, the eluted quantity of gallium is therefore 82.29 grams and the loss of gallium relative to the fixed gallium is only 0.1 gram.

The final washing of the resin is carried out using 87 liters of water 25 at 50° C. After collection of the first 15 liters mentioned above, a second fraction of 27 liters constitutes the liquor 23b which is to be recycled.

The third fraction collected at the outlet of the column has a volume of 30 liters and constitutes the recycled liquor 17. The fourth and final fraction 26 has a volume of 15 liters and contains: $H_2SO_4 = 4.67$ g/l. This liquor is rejected together with the liquor 20 issuing from elution operation No. 1 after neutralization with limestone 24.

The sulphuric liquor 2 is intended for the production of the gallium is brought to 60° C. in a stirred reactor. Some milk of lime 27 is introduced slowly and continuously into the reactor until the mixture reaches pH 2. The suspension 28 obtained is filtered under vacuum and the filter cake is washed with 50 liters of hot water 29. The spun solid 30, composed of calcium sulphate, weighs 39.1 kg and contains 7.7 ppm of Ga. The filtrates are combined and form a liquor 31 having a volume of 83.5 liters containing: $Ga = 0.982$ g/l; total $H_2SO_4 = 4.44$ g/l; free $H_2SO_4 = 0.63$ g/l; $Fe = 53$ mg/l; $Al = 0.1$ g/l; $Zn = 1.7$ mg/l.

At this stage, the quantity of gallium is therefore 81.99 grams, denoting a loss of 0.30 gram relative to the gallium contained in the acid elution solution, this loss corresponding to the gallium entrained into the calcium sulphate precipitate.

This liquor 31 is then heated to 60° C. in a stirred reactor together with a recycled liquor 7a having a volume of 1 l and containing: $Ga = 18$ g/l; total $HCl = 33$ g/l, as well as a further recycled liquor 9a having a volume of 0.6 l and containing: $Ga = 50$ g/l; total $HCl = 92$ g/l. To this mixture there are added 1086 g of 20.8% soda solution 32 and 2 l of an aqueous solution 33 comprising 50 g/l of $Na_2S_2O_3$, 5 $H_2O$; the addition of soda allows pH 4 to be achieved.

The precipitate 34 obtained in this way and composed essentially of gallium and aluminum hydroxides is filtered under vacuum and washed with 7 liters of pure water 37. The filtrate 16 is rejected whereas the filter cake 35 having a mass of 1.6 kg is then dissolved with 3.215 kg of 32% hydrochloric acid 36. The filtered hydrochloric solution 5 has a volume of 4.33 liters and contains: $Ga = 30$ g/l; total $HCl = 237.4$ g/l; free $HCl = 182$ g/l; $Fe = 115$ mg/l; $Zn = 0.35$ mg/l; $Al = 1.9$ g/l. It is found that the iron and zinc have been purified in large proportions relative to the liquor 2. This is due to the conditions of precipitation of $Ga(OH)_3$ of pH 4 and in a thiosulphate reducing medium, because the divalent metals do not precipitate before pH 6 under these conditions.

An organic solution 38a containing, by mass: tributylphosphate = 25%; isotridecanol = 10%; Resex (heavy aromatic solvent) = 65%, is thus used or continuously extracting the previous liquor 5 using a battery of 3 mixer/decanters operating in a counter-current. The phase ratio is adjusted so that the 4.33 liters of aqueous phase correspond to 3.25 l of organic phase. This extraction operation as well as the following ones are carried out at ambient temperature. The raffinate 8 obtained, having a volume of 4 liters, contains: $Ga = 7.57$ g/l. The corresponding extract 45 having a volume of 3.5 liters contains: $Ga = 28.5$ g/l, corresponding to a value close to the saturation of the organic phase.

This extract is eluted with water 46 in a proportion of 0.82 l of water per 3.5 l, owing to 4 stages of counter-current mixer/decanters. The aqueous eluate 6 having a $pH \leq 2$ and a volume of 0.835 l contains $Ga = 119$ g/l; total $HCl = 2.5$ g/l; $Fe = 4$ mg/l; $Zn < 0.1$ mg/l; $Al < 1$ mgl/l. It is therefore found that the iron and zinc have been re-purified owing to the particular conditions of extraction. These two elements would have been completely extracted with the gallium if the tributylphosphate had not been used under the conditions described above.

This liquor 6 is used for producing 81.4 g of metallic gallium 10 having a purity of 4 N by electrolysis over a liquid Ga cathode after passage of a 20 A current for 10 hours 30 minutes. The partially depleted electrolyte constitutes the liquor 7b to be recycled to the hydroxide precipitation stage.

On the other hand, the aqueous liquor or raffinate 8 obtained above, still containing gallium, is extracted in two stages with counter-current using 1.6 liters of organic phase 40a having the same composition as 38a for 4 l of liquor 8. The raffinate 11, which is depleted in gallium and contains all the aluminum, constitutes an effluent to be neutralized before rejection. The corresponding extract 39 is then eluted with water 42 in two stages with counter-current, with a phase ratio of 0.6 liters of water to 1.6 liter of organic phase or extract 39. The aqueous eluate constitutes the solution 9b to be recycled. As this elution operation, as well as the previous one, has produced regenerated organic phases 43 and 44, these regenerated organic phases are mixed in order to be washed with a 5% solution of Na$_2$CO$_2$, then with an approximately 10% solution of HCl, before being redistributed to the two extraction operations described above by the flows 38 and 40.

If it is considered that, in the final evaluation of substances, the recycled flows 7 and 9 have identical compositions during stationary working from one operation (a) to the other (b), the quantity of gallium used before the Ga (OH)$_3$ precipitation stage is therefore 81.99 + 30 + 18 = 129.99 grams whereas, at the end of the successive stages of precipitation, acid dissolution, extraction with TBP, elution and finally electrolysis, the quantity of gallium obtained is 81.4 + 30 + 18 = 129.40 grams, that is a loss of 0.59 grams.

The total losses relative to 82.30 grams to be fixed at the beginning on the impregnate resin is therefore 0.01 + 0.30 + 0.59 = 0.90 gram and the overall yield of gallium substance from the extraction stage to the final stage of metal gallium having a purity of 4N is therefore:

$$100/(82.30 - 0.90)/82.30)/ = 98.90\%.$$

order of 0.8. The raffinate 8 issuing from the extraction zone, which is intentionally note depleted in gallium, is passed to a second extraction battery comprising a zone with 3 extraction stages and a zone with 2 re-extraction stages where there are collected at the outlet, according to FIGS. 2 and 3, on the one hand, a second raffinate 11, this time depleted in gallium and containing a large fraction of the impurities from the liquor 5 and, on the other hand, an aqueous "second eluate" 9 which is recycled upstream. Furthermore, the gallium-containing organic solution 45 or "first extract" after counter-current washing with an aliquot 6B of aqueous eluate 6 provides the washed solution 45A which, after elution with water, produces the liquor 6C intended for electrolysis after removal of the aliquot 6B.

The contents of impurities relative to the gallium in the aqueous eluate 6C having a concentration Ga = 110 g/l are indicated in Table 2 below. The contents of impurities in ppm relative to Ga in the impure gallium chloride solution 5 (Table 1) as well as in an aqueous eluate 6 which has issued directly from the extraction 1 and has not therefore been subjected to intermediate counter-current washing as in Example 1, are indicated for comparison purposes.

TABLE II

| ppm/Ga | Fe | Na | Ca | Ti | As | P | Al | Zn | Cu |
|---|---|---|---|---|---|---|---|---|---|
| Liquor 5 | 3570 | 11250 | 1710 | 1030 | 2760 | 1000 | 88000 | 50 | 46 |
| Unwashed eluate 6 | 90 | 30 | 100 | 30 | <20 | <10 | 20 | <2 | 1 |
| Eluate 6C | 2.7 | 18 | 90 | 9 | <9 | <2.7 | 9 | <2 | 0.5 |

EXAMPLE 2

This example describes a variation involving the counter-current washing, prior to elution with water, of the TBP-based organic phase saturated in gallium. As this variation allows more highly advanced purification of the gallium chloride solutions intended for electrolysis, it is of particular value for the treatment of mixed solutions of gallium originating from the upstream stages composed of the mixture of the industrial liquor 2, FIG. 2, from the Bayer process with a large proportion of liquors of external origin 27, FIG. 2, such as the hydrochloric solutions of gallium waste based on gallium arsenide. These solutions introduce specific impurities such as As or accidental impurities such as Cu which are added to the basic impurities constituted by Fe, Zn, Al, Na.

According to FIG. 3, a mixed solution of this origin forms, after addition of the gallium chloride solutions 7 and 9 recycled from upstream, a liquor 5, the gallium concentration of which is 40.9 g/l and the impurity concentrations of which are indicated in the following table.

TABLE 1

| Impurities g/l | Fe | Na | Ca | Ti | As | H$_3$PO$_4$ | Al | Zn | Cu |
|---|---|---|---|---|---|---|---|---|---|
| | 0.146 | 0.46 | 0.07 | 0.042 | 0.113 | 0.13 | 3.6 | 0.002 | 0.0019 |

This liquor 5 is mixed with the flow 6A resulting from the washing 1 of the gallium-containing organic solution 45 to form the liquor 5A, the gallium concentration of which is 51.1 g/liter with Fe 0.133 g/l, Na 0.41 g/l and Al 3.2 g/l as main impurities.

This liquor 5A continuously supplies a first battery of mixer/decanters comprising a zone with 4 extraction stages, a zone with 4 washing stages and a zone with 5 elution stages where it is brought into contact with a regenerated organic solution 38 in a volumetric ratio of organic solution to gallium chloride solution of the A significant reduction in the contents of impurities and, more particularly, in the iron when intermediate washing is carried out is observed. This purification is also confirmed between each washing stage, proving that the washing of the gallium-containing solvent not only has the effect of eliminating the blisters of aqueous phase possibly entrained in the organic phase, but involves a chemical distribution, the effect of which increases exponentially with the number of washing stages carried out.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for extracting and purifying gallium contained in a sodium aluminate solution, comprising the following sequence of steps:
   (a) impregnating a porous adsorbent resin with a 7-alkyl-8-hydroxyquinoline extracting agent in the presence of a volatile solvent;
   (b) evaporating said volatile solvent;
   (c) hydrating said porous adsorbent resin;
   (d) fixing gallium onto said porous adsorbent resin by passing a sodium aluminate solution taken directly from a Bayer cycle, having a precipitation stage, and kept at a temperature of between 30° C. and 60° C., over said porous adsorbent resin;
   (e) washing said porous adsorbent resin with water;

(f) eluting gallium fixed onto said porous adsorbent resin with a strong mineral acid having a concentration of between 0.7 N and 7N;

(g) performing a first purification and concentration operation of the gallium by precipitating the gallium in a reducing medium to gallium hydroxide and redissolving the gallium in the form of gallium chloride;

(h) performing a second purification and concentration operation of the gallium by contacting the gallium chloride with an organic solution comprising tributylphosphate, a $C_{8\text{-}13}$ alcohol, and an aromatic solvent, until said organic solution is saturated with gallium, and then eluting with water; and (i) subjecting to electrolysis the concentrated and purified gallium chloride solution to obtain metallic gallium.

2. The process of claim 1, wherein said gallium obtained in step (i) has a purity of 99.99 wt.%.

3. The process of claim 1, comprising impregnating said porous absorbent resin with a 7-alkyl-8-hydroxyquinoline extracting agent and surface-active agent.

4. The process of claim 3, wherein the surface-active agent is a quaternary ammonium chloride of the formula $R_3CH_3NCl$ in which R contains between 8 and 10 carbon atoms.

5. The process of claim 1, wherein said strong mineral acid is sulphuric acid.

6. The process of claim 4, wherein the mineral acid solution of gallium containing sulphuric acid obtained in step (f) is pre-neutralized to pH = 2 by milk of lime or calcium carbonate to precipitate gallium sulphate, which is eliminated after filtration.

7. The process of claim 1, wherein said porous adsorbent resin is a non-polar and hydrophobic polystyrene resin.

8. The process of claim 1, wherein said porous adsorbent resin is impregnated with said 7-alkyl-8-hydroxyquinoline extracting agent in a proportion of 150 grams to 400 grams of said extracting agent per liter of dry resin.

9. The process of claim 1, wherein the extracting agent is dissolved in a volatile solvent to which a surface-active agent is added in a proportion of from 5 to 15% of its weight.

10. The process of claim 1, wherein the porous adsorbent resin is used directly after impregnation, drying and hydration.

11. The process of claim 1, wherein the solution of sodium aluminate is taken from said Bayer cycle, after the precipitation stage in said Bayer cycle, and has a gallium concentration of between 150 mg and 500 mg per liter of solution, a total soda concentration expressed as $Na_2O$ of between 100 g and 220 g per liter of solution, and a concentration of dissolved $Al_2O_3$ of between 50 g and 130 g per liter of solution.

12. The process of claim 1, wherein, in said step (d), said porous absorbent resin is brought into contact for 4 to 12 hours with said sodium aluminate solution, which sodium aluminate solution is circulating at an hourly flow rate of 2 to 10 times the apparent volume of contacted porous adsorbent resin.

13. The process of claim 1, wherein, after washing the resin with 1 to 3 times its volume of water in step (e), the gallium fixed on the resin is redissolved by a double elution operation carried out at about 50° C. with a strong acid at a concentration which is first between 0.7 N and 1.2 N and then at a concentration of between 4 N and 7 N.

14. The process of claim 13, wherein sulfuric acid is used in the double elution operation.

15. The process of claim 1, wherein said solution of eluted gallium obtained in step (f) contains from 1 to 20 g of gallium per liter and, as main impurities, Al, Fe, Zn and Na in solution.

16. The process of claim 1, wherein, to the mineral acid solution of eluted gallium obtained in step (f), there is added an acid solution containing from 1 to 20 grams of gallium and originating from another gallium recovery process.

17. The process of claim 16, wherein said mineral acid solution containing from 1 to 20 grams of gallium and originating from another gallium recovery process is an acid solution obtained from the extraction of gallium by liquid-liquid means from an alkaline liquor containing it and the acid solution used to attach the gallium-containing waste based on gallium arsenide.

18. The process of claim 1, wherein in step (g) an acid solution of gallium containing n free sulphuric acid is:
 (1) mixed with a recycled solution which is partially depleted of gallium and originating from a downstream stage of purification, concentration and electrolysis stages, then
 (2) neutralized with sodium hydroxide by precipitation which is then separated by decantation or filtration, or both, and redissolved, with HCl, as gallium chloride.

19. The process of claim 1, wherein the solution of gallium chloride obtained in step (g) is brought into contact, at ambient temperature, with an organic solution comprised of tributylphosphate in a proportion of 25% by weight, of a $C_8$ to $C_{13}$ alcohol in a proportion of 10% by weight and a heavy aromatic solvent in a proportion of 65% by weight, until the organic solution is saturated in gallium.

20. The process of claim 19, wherein the ratio of the volume of said organic solution to the volume of said solution of gallium chloride is about 0.8 when the gallium concentration of this solution is at least 30 g/liter.

21. The process of claim 1, wherein the gallium-containing organic solution obtained in step (h), after being placed in contact with said solution of gallium chloride and prior to elution with water in step (h), is washed in a counter-current manner with an aliquot of the gallium-containing aqueous phase issuing from the subsequent elution with water stage of step (h).

22. The process of claim 21, wherein, after said counter-current washing, the gallium-containing aqueous phase aliquot is mixed with said solution of gallium chloride of step (g), before the stage (h) extraction with said organic solution.

23. The process of claim 21, wherein the organic solution which is loaded with gallium after counter-current washing is eluted with water to form an organic phase and an aqueous phase, said organic phase being an organic solution which can be regenerated and re-used after washing and, said aqueous phase being an aqueous elute having a high concentration of gallium in the chloride stage, of which an aliquot part is removed for counter-current washing of the gallium-containing organic solution and the remaining fraction is suitable for electrolysis.

24. The process of claim 23, wherein the aqueous eluate, having a high concentration of gallium in the chloride state has a pH $\leq 2$.

25. The process of claim 23, wherein the aqueous eluate is electrolyzed in the presence of a liquid gallium chloride to produce metallic gallium having a purity of 99.99 wt% and an electrolyte solution which is impoverished of gallium and is recycled to stage (g).

26. The process of claim 1, wherein the gallium-containing organic solution, after being brought into contact with the acid solution of gallium chloride, is eluted directly with water to form (i) a regenerable organic solution and an (ii) aqueous eluate having a high concentration of gallium, in the chloride state, suitable for electrolysis.

27. The process of claim 1, wherein the mineral acid solution of gallium chloride which is impoverished of gallium after the first extraction carried out by the organic solution is brought into contact with the organic solution for a second time in order to extract the residual gallium which, after elution with water, is recycled to state (g) for precipitation of the gallium hydroxide.

28. The process of claim 1, wherein the reagents used in the process according to the invention are recycled to a stage of the process or to a state of the Bayer cycle for the production of alumina.

* * * * *